United States Patent
Jobi

(10) Patent No.: US 10,419,732 B2
(45) Date of Patent: Sep. 17, 2019

(54) SEALING UNIT AND PROJECTOR

(71) Applicant: CASIO COMPUTER CO., LTD., Shibuya-ku, Tokyo (JP)

(72) Inventor: Osamu Jobi, Hachioji (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 68 days.

(21) Appl. No.: 15/452,789

(22) Filed: Mar. 8, 2017

(65) Prior Publication Data
US 2017/0366790 A1 Dec. 21, 2017

(30) Foreign Application Priority Data
Jun. 20, 2016 (JP) ................. 2016-121321

(51) Int. Cl.
*H04N 5/64* (2006.01)
*H04N 5/645* (2006.01)
*H04N 9/31* (2006.01)

(52) U.S. Cl.
CPC ........... *H04N 9/3144* (2013.01); *H04N 9/315* (2013.01); *H04N 9/3161* (2013.01)

(58) Field of Classification Search
CPC ............................. H04N 9/3144; H04N 9/315
USPC ........ 348/748, 836, 794, 787, 744; 353/119, 353/52, 56, 74
See application file for complete search history.

(56) References Cited

U.S. PATENT DOCUMENTS

2014/0293239 A1* 10/2014 Shimizu ............. G02B 27/0149
353/52

FOREIGN PATENT DOCUMENTS

JP 2014194501 A 10/2014

\* cited by examiner

*Primary Examiner* — Jefferey F Harold
*Assistant Examiner* — Jean W Desir
(74) *Attorney, Agent, or Firm* — Holtz, Holtz & Volek PC

(57) ABSTRACT

A sealing unit has a case including an opening portion having an attachment surface, a seal member including an annular flat plate portion and an annular rib portion provided to rise from one flat plate surface of the annular flat plate portion and made of an elastic material, an attachment member including an annular attachment surface, a fixing member, and a fastening member, and an outer circumferential surface of the annular rib portion is brought into abutment with the attachment surface of the opening portion, an inner circumferential surface of the annular rib portion is brought into abutment with the attachment surface of the attachment member, the fixing member comes into abutment with the other flat plate surface of the seal member and is fixed to the attachment member, and the fastening member comes into abutment with the other flat surface and is fixed to the case.

7 Claims, 10 Drawing Sheets

SEALING UNIT AND PROJECTOR

CROSS-REFERENCE TO RELATED APPLICATION

This application is based upon and claims the benefit of priority under 35 USC 119 from Japanese Patent Application No. 2016-121321 filed on Jun. 20, 2016, the entire disclosure of which, including the specification, claims, drawings and abstract, is incorporated herein by reference.

BACKGROUND OF THE INVENTION

Field of the Invention

The present invention relates to a sealing unit and a projector including this sealing unit.

Description of the Related Art

In these days, projectors are used on many occasions as image projection systems which project a screen of a personal computer and a video image, as well as images based on image data which is stored on a memory card onto a screen. These projectors are such that light emitted from a light source is collected onto a micromirror display device called a digital micromirror device (DMD) or a liquid crystal panel, so that a color image is projected onto a screen for display.

The application of these projectors as image projection systems is expanded from a presentation in a business scene to a domestic use in association with the propagation of personal computers and video equipment such as DVD players. Conventionally, the mainstream of these projectors has been those which utilize a high-intensity discharge lamp as a light source. In recent years, however, there have been made developments of various types of projectors which use, as a light source, a plurality of semiconductor light emitting devices such as laser diodes.

For example, Japanese Unexamined Patent Application No. 2014-194501 discloses a projector for a head-up display system which utilizes as light sources laser diodes which emit lights in the red, green and blue wavelength ranges. The red, green and blue laser diodes and optical modules are accommodated in a case. A plurality of cylindrical heat conductive members are attached to opening portions in a lower surface of the case. An annular groove is formed around an outer circumference of each of the heat conductive members, so that a seal member which is an O-ring is fitted in the annular groove. Inner end faces of the heat conductive members are thermally connected to an LD holder which holds the laser diodes. Peltier devices are provided on outer end faces of the heat conductive members for thermal connection. These Peltier devices are connected to a heat dissipating plate having a number of fins.

Normally, predetermined permissible assemblage tolerances in relation to the attaching dimensions to the case are given to the members such as the LD holder and the optical modules which are provided within the case and which constitute objects to be cooled. Then, the heat conductive members which are attachment members to be attached to the case are attached to the case in such a way that the inner end faces of the heat conductive members are brought into face contact with a contact surface of the LD holder so that heat is conducted effectively. As this occurs, in case the LD holder is attached obliquely to the case within the permitted assemblage tolerance, the heat conductive members are attached obliquely to the opening portions of the case. Then, there may be caused a case where the O-rings of the heat conductive members are not pressed sufficiently to the opening portions of the case or the O-rings are twisted so as not to seal the opening portions as required in attaching the heat conductive members to the opening portions.

SUMMARY OF THE INVENTION

An object of the invention is to provide a sealing unit which enhances the sealing performance of an opening portion in a case where an attachment member is attached and a projector which includes the sealing unit.

According to an aspect of the invention, there is provided a sealing unit, having:

a case which includes an opening portion on an inner circumference of which an attachment surface is formed;

a seal member which includes an annular flat plate portion whose side edge surfaces constitute an inner and outer circumferential surfaces and an annular rib portion which is provided on one flat plate surface of the annular flat plate portion so as to rise therefrom and which is made of an elastic material;

an attachment member which includes an annular attachment surface on an outer circumference thereof;

a fixing member; and a fastening member, wherein an outer circumferential surface of the annular rib portion of the seal member is brought into abutment with the attachment surface of the opening portion, wherein an inner circumferential surface of the annular rib portion of the seal member is brought into abutment with the attachment surface of the attachment member, wherein the fixing member is brought into abutment with the other flat plate surface of the seal member and is fixed to the attachment member, and wherein the fastening member is brought into abutment with the other flat surface of the seal member and is fixed to the case.

According to another aspect of the invention, there is provided a projector, including:

the sealing unit described above, wherein the case accommodates:

a light source unit;

a display device on which light source light is shone to thereby form image light;

a projection-side optical system which projects the image light emitted from the display device onto a screen; and a projector control unit which controls the display device and the light source unit, and wherein the cooling member is disposed so as to be brought into abutment with the light source unit.

DETAILED DESCRIPTION OF THE PREFERRED EMBODIMENT

Figure 1:
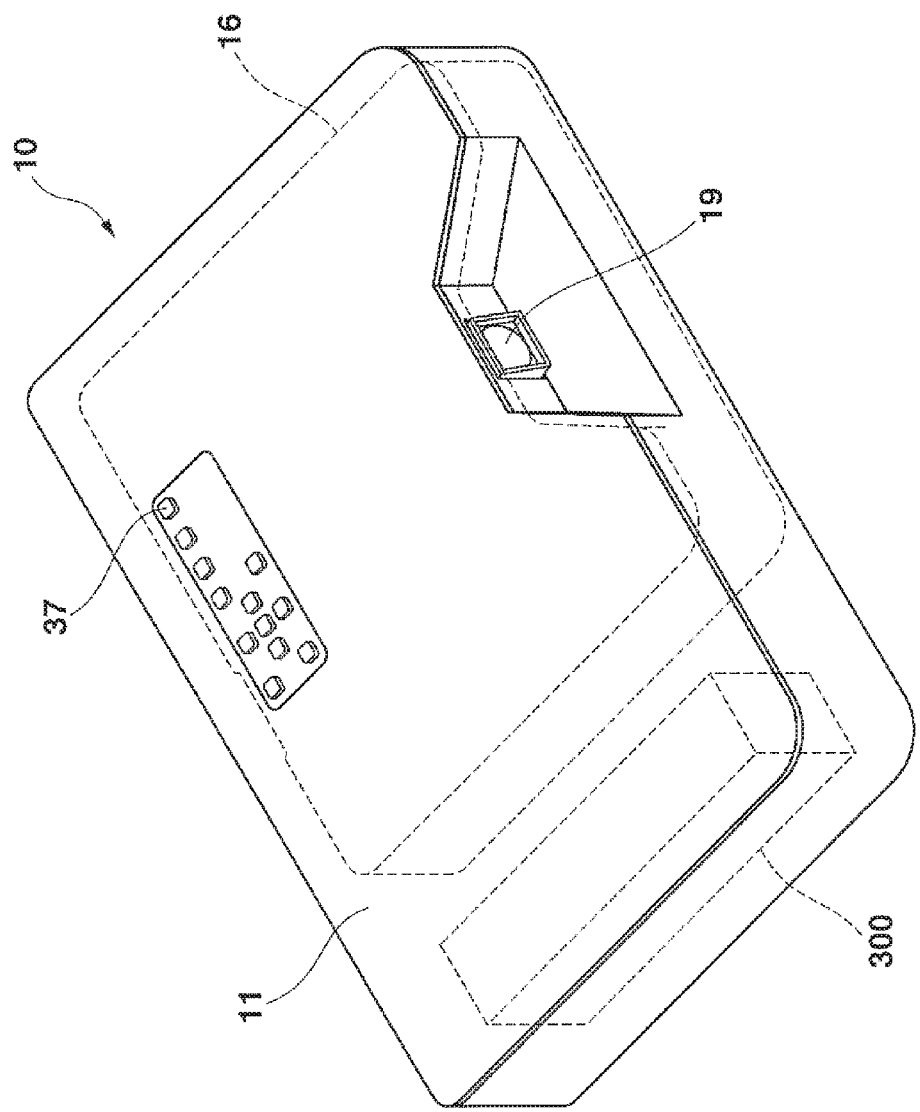
FIG. 1 is an external perspective view showing a projector according to an embodiment of the invention.

Hereinafter, an embodiment of the invention will be described by the use of the drawings. FIG. 1 is an external perspective view of a projector 10. In the following description, when referred to in relation to the projector 10, left and right denote, respectively, left and right in relation to a projecting direction of the projector 10, and when referred to in relation to the projector 10, front and rear denote, respectively, front and rear in relation to the direction of a screen and a traveling direction of a pencil of light that is emitted from the projector 10 towards a screen.

A casing 11 of the projector 10 has a substantially rectangular parallelepiped shape. A recessed portion is formed in a position at a left end portion of a front side of the projector 10. A projection port 19 is disposed in the recessed portion. The recessed portion where the projection port 19 is disposed is formed into a trapezoidal shaped when seen from thereabove in such a way that the recessed portion expands in width as it extends to the front of the projector 10. Then, the projection port 19 is provided in a rear wall surface of the recessed portion. An image is projected in the direction of a screen from the projection port 19. Further, although not shown, the projector 10 includes an IR reception unit which receives a control signal from a remote controller. Additionally, although not shown, an image signal input terminal cord and a power supply cord are provided on a rear surface of the casing 11.

In addition, a keys/indicators unit 37 is provided on an upper surface of the casing 11. Disposed on this keys/indicators unit 37 are keys and indicators which include a power supply switch key, a power indicator, a projection switch key, an overheat indicator, and the like. The power indicator informs whether a power supply is on or off. The projection switch key switches on or off the projection by the projector 10. The overheat indicator informs of an overheat condition occurring in a light source unit, a display device, a control circuit or the like when they really overheat. In addition, a substantially rectangular case 16 which accommodates alight source unit 60, alight source-side optical system 170, a projection-side optical system 220 and a display device 51, which will all be described later, and a cooling unit 300 are accommodated in an interior of the casing 11. The case 16 is made up of an upper lid 16a and a lower case 16b (refer to FIG. 4) and is formed so that an interior thereof is tightly closed.

Figure 2:
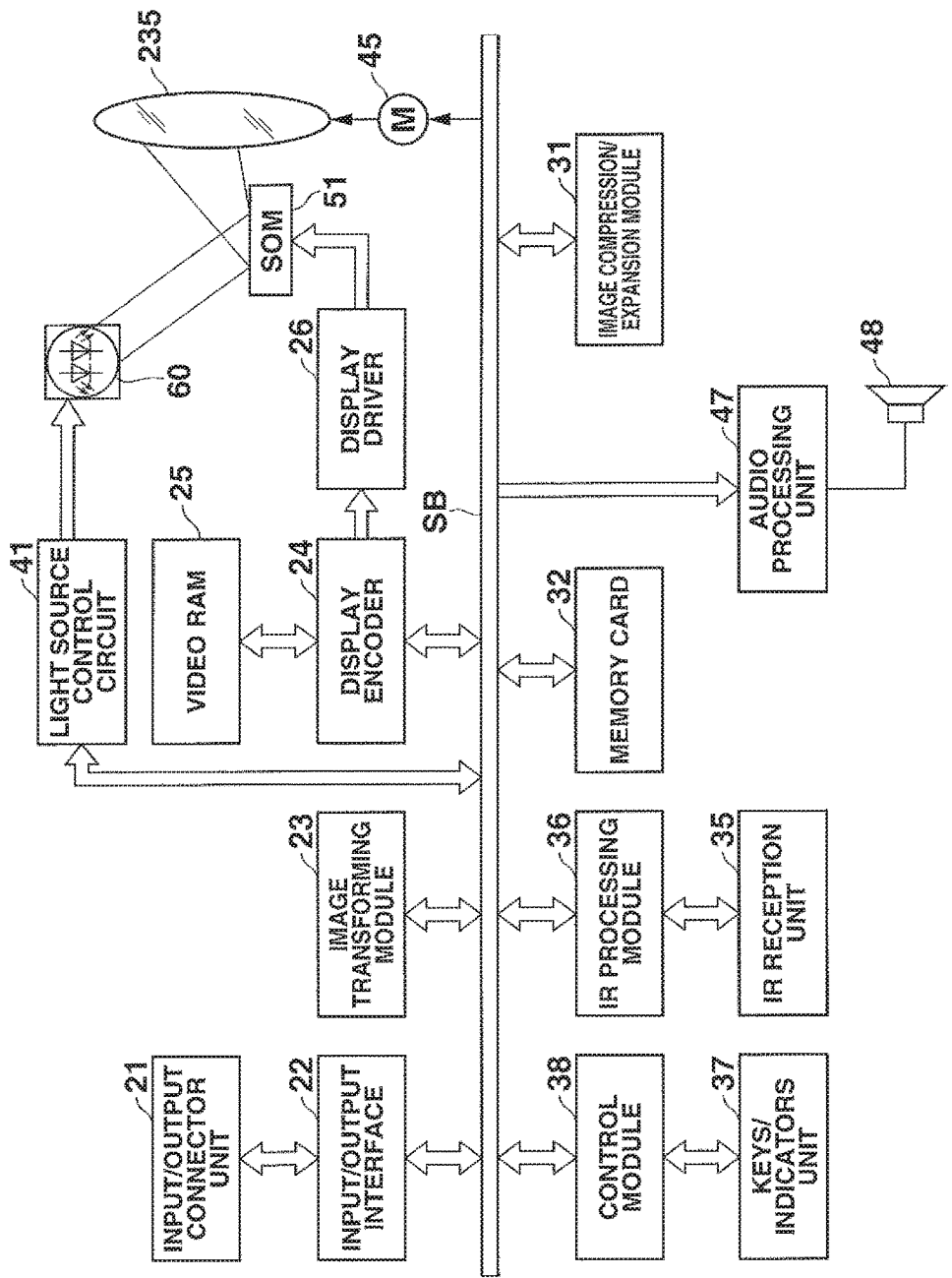
FIG. 2 is a block diagram showing functional blocks of the projector according to the embodiment of the invention.

Next, a projector control unit of the projector 10 will be described by the use of a functional block diagram shown in FIG. 2. The projector control unit includes a control module 38, an input/output interface 22, an image transforming module 23, a display encoder 24, a display driver 26 and the like.

This control module 38 governs the control of respective operations of circuitries within the projector 10 and is made up of a CPU, a ROM which stores in a fixed fashion operation programs of various types of settings, a RAM which is used as a working memory and the like.

Image signals of various standards which are inputted from an input/output connector unit 21 are sent via the input/output interface 22 and a system bus (SB) to the image transforming module 23 where the image signals are transformed so as to be unified into an image signal of a predetermined format which is suitable for display by the projector control unit. Thereafter, the image signals so transformed are outputted to the display encoder 24.

The display encoder 24 deploys the image signals that have been inputted thereinto on a video RAM 25 for storage therein and generates a video signal from the contents stored in the video RAM 25, outputting the video signal so generated to the display driver 26.

The display driver 26 functions as a display device control device. The display driver 26 drives a display device 51, which is a spatial optical modulator (SOM), at an appropriate frame rate in response to the output of the image signal from the display encoder 24. The display driver 26 shines a pencil of light which is emitted from the light source unit 60 onto the display device 51 via the light source-side optical system, which will be described later, whereby an optical image is formed by using reflected light which is reflected by the display element 51. The image so formed is then projected onto a screen, not shown, for display thereon via the projection-side optical system. In addition, a movable lens group 235 of the projection-side optical system is driven by a lens motor 45 for zooming or focusing.

An image compression/expansion unit 31 performs a recording operation in which a luminance signal and a color difference signal of an image signal are data compressed through ADCT and Huffman coding processes and the compressed data is sequentially written on a memory card 32 which is configured as a detachable recording medium.

Further, when the projector 10 is in a reproducing mode, the image compression/expansion unit 31 performs the following operation. Specifically, the image compression/expansion unit 31 reads out image data recorded on the memory card 32 and expands individual image data which make up a series of dynamic images frame by frame. Then, the image compression/expansion unit 31 outputs the image data to the display encoder 24 via the image transforming module 23 so as to enable the display of dynamic images and the like based on the image data stored on the memory card 32.

Operation signals generated at the keys/indicators unit 37 which includes the main keys and indicators which are provided on the upper surface of the casing 11 are sent out directly to the control module 38. Key operation signals from the remote controller are received by the IR reception unit 35, and a code signal demodulated at an IR processing unit 36 is outputted to the control module 38.

An audio processing unit 47 is connected to the control module 38 via the system bus (SB) . This audio processing module 47 includes a circuitry for a sound source such as a PCM sound source or the like. When the projector 10 is in a projection mode and the reproducing mode, the audio processing unit 47 converts audio data into analog signals and drives a speaker 48 to output loudly sound or voice based on the audio data.

The control module 38 controls a light source control circuit 41 which is configured as a light source control unit. The light source control circuit 41 controls individually the operations of an excitation light source and a red light source device so as to emit lights in red, green and blue wavelength ranges, respectively, at predetermined timings so that lights in the specified wavelength ranges which are required in producing an image are emitted from the light source unit 60.

Figure 3:
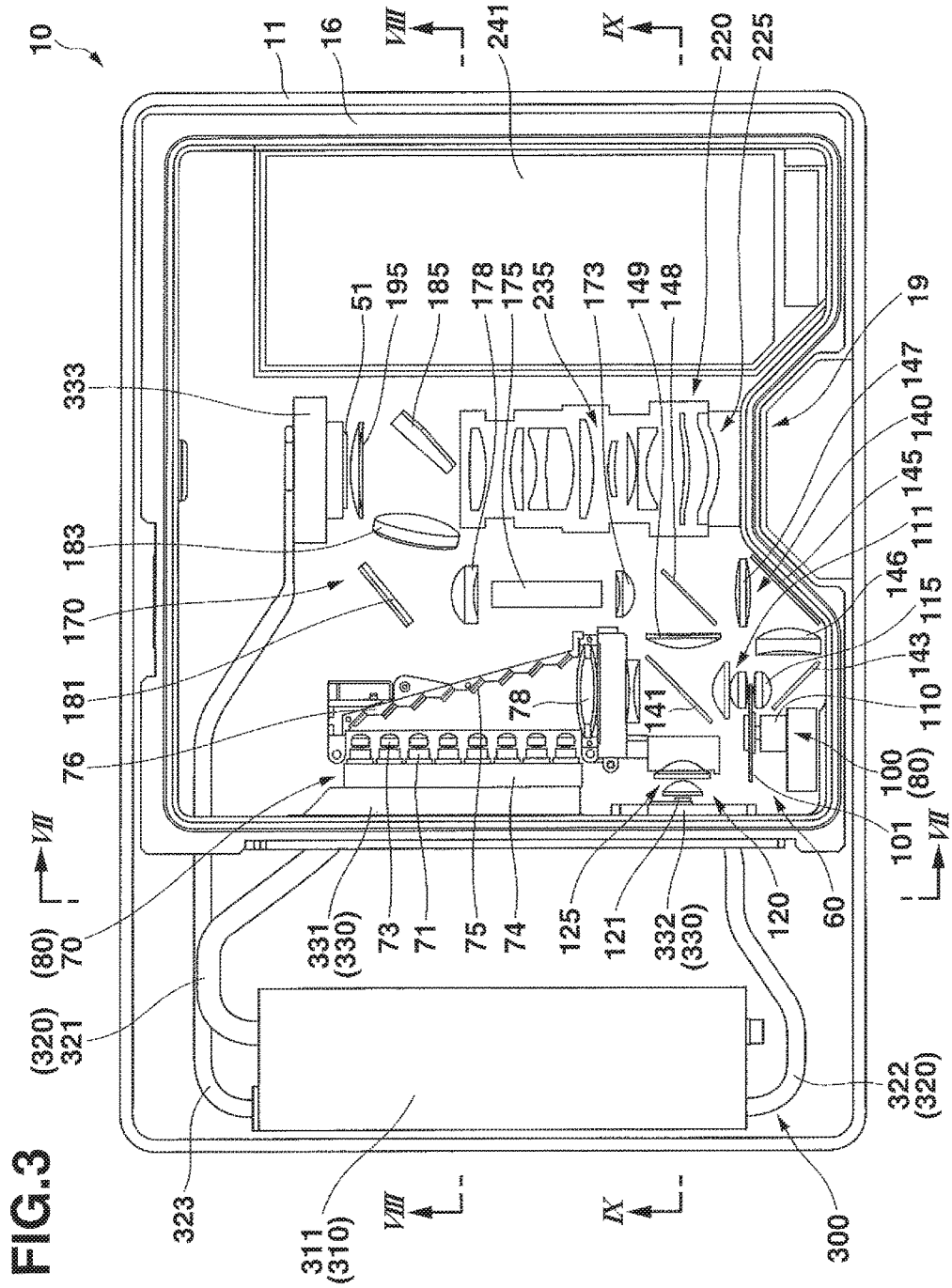
FIG. 3 is a schematic plan view showing an internal construction of the projector according to the embodiment of the invention.

Next, an internal construction of the projector 10 will be described based on FIG. 3. FIG. 3 is a schematic plan view showing the internal construction of the projector 10 with the upper surface of the casing 11 of the projector 10 and an upper lid 16a of the case 16 (refer to FIG. 4) omitted. The projector 10 includes a control circuit board 241 at a left side in the case 16. In addition, the light source unit 60 is disposed at a right side in the case 16. The light source-side optical system 170 and the projection-side optical system 220 are disposed substantially at a center of the case 16.

The light source unit 60 includes an excitation light shining device 70, a red light source device 120 and a green light source device 80. The excitation light shining device 70 is a light source of light in the blue wavelength range and doubles as an excitation light source. The red light source device 120 is a light source of light in the red wavelength range. The green light source device 80 is made up of the excitation light shining device 70 and a luminescent plate device 100. The light source unit 60 also includes a light guiding optical system 140 which guides light in the blue wavelength range, light in the green wavelength range and light in the red wavelength range. The light guiding optical system 140 guides lights in the blue, green and red wavelength ranges which are emitted from the blue, green and red light source devices 70, 80, 120, respectively, to an incident or entrance port of a light tunnel 175.

The excitation light shining device 170 is disposed near a right wall of the case 16. The excitation light shining device 70 includes a light source group made up of blue laser diodes, a reflecting mirror group 75 and a collective lens 78. The light source group is made up of a plurality of blue laser diodes 71 which are semiconductor light emitting devices and which are disposed so that lights are emitted therefrom from the right to the left in a direction which is normal to a projecting direction. The plurality of blue laser diodes 71 are held integrally by a holder 74 which is formed into a block-like shape. The reflecting mirror group 75 is made up of a plurality of reflecting mirrors which turn axes of lights emitted from the blue laser diodes 71 through 90 degrees towards the front of the projector 10. The collective lens 78 collects the lights emitted from the blue laser diodes 71 and reflected by the reflecting mirror group 75.

In the light source group, the plurality of blue laser diodes 71, which are semiconductor light emitting devices, are arranged into a matrix of three rows and eight columns, and therefore, 24 blue laser diodes 71 are provided in the excitation light shining device 70. Collimator lenses 73 are disposed individually on optical axes of the blue laser diodes 71. The collimator lenses 73 convert lights emitted from the corresponding blue laser diodes 71 into parallel rays so as to enhance the directivity of the lights emitted from the laser diodes 71. The plurality of reflecting mirrors of the reflecting mirror group 75 are arranged into a step-like configuration, and the reflecting mirrors are integrated with a mirror substrate 76 while being adjusted in position. The reflecting mirror group 75 narrows sectional areas of pencils of light emitted from the blue laser diodes 71 in one direction for emission to the collective lens 78.

The red light source 120 includes a red light source 121 which is disposed so that an optical axis thereof becomes parallel to the blue laser diodes 71 and a collective lens group 125 which collects light emitted from the red light source 121. This red light source 121 is a red light emitting diode which is a semiconductor light emitting device and emits light in the red wavelength range. Then, the red light source device 120 is disposed so that an axis of light in the red wavelength range emitted therefrom intersects an axis of light in the blue wavelength range emitted from the excitation light shining device 70 and an axis of light in the green wavelength range emitted from a luminescent plate 101.

The luminescent plate device 100 which makes up the green light source device 80 is disposed on an optical path of excitation light emitted from the excitation light shining device 70 and near a portion of a font wall of the case 16 which lies at the right side in the case 16. The luminescent plate device 100 includes the luminescent plate 101, a motor 110 which drives to rotate the luminescent plate 101, a collective lens group 111 and a collective lens 115. The luminescent plate 101 is a luminescent wheel which is disposed so as to be at right angles to an axis of light emitted from the excitation light shining device 70. The collective lens group 111 collects a pencil of excitation light emitted from the excitation light shining device 70 to the luminescent plate 101 and also collects a pencil of light emitted from the luminescent plate 101 to the rear . The collective lens 115 collects a pencil of light which passes through a diffuse transmission area on the luminescent plate 101 to exit therefrom to the front.

The luminescent plate 101 includes a luminous light emitting area and a diffuse transmission area which are provided continuously in an end-to-end fashion in a circumferential direction. The luminous light emitting area receives light emitted from the excitation light shining device 70 by way of the collective lens group 111 as excitation light to emit luminous light in the green wavelength range. The diffuse transmission area transmits excitation light which is light emitted from the excitation light shining device 70 or transmits the excitation light while diffusing it.

A base material of the luminescent plate 101 is a metallic base material formed of copper or aluminum. An annular groove is formed on a surface of the base material which faces the excitation light shining device 70. A bottom portion of the groove is mirror finished through silver deposition or the like. Then, a layer of green luminescent material is laid on a surface of the mirror finished portion. Further, in the case of the diffuse transmission area which transmits excitation light or transmits excitation light while diffusing it being formed as a transmission area, a transparent base material having a light transmission property is fitted in a through hole portion formed by cutting out part of the base material. In the case of the diffuse transmission area being formed as a diffuse transmission area, a transparent material on a surface of which minute irregularities are formed thorough sandblasting is fitted in the through hole portion.

When light in the blue wavelength range emitted from the excitation light shining device 70 is shone onto the green luminescent material layer of the luminescent plate 101 as excitation light, the green luminescent material in the green luminescent material layer is excited, whereby light in the green wavelength range is emitted in every direction from the green luminescent material. A pencil of luminous light is emitted to the rear to be incident on the collective lens group 111. On the other hand, light in the blue wavelength range emitted from the excitation light shining device 70 which is incident on the diffuse transmission area of the luminescent plate 101 is transmitted therethrough as it is or transmitted while being diffused to be incident on the collective lens 115 which is disposed on a back surface side of the luminescent plate 101.

The light guiding optical system 140 includes collective lenses which collect pencils of light in the red, green and blue wavelength ranges, reflecting mirrors which turn axes of the pencils of light in the red, green and blue wavelength ranges so that the axes of the red, green and blue lights are directed into the same direction, and dichroic mirrors. Specifically, the light guiding optical system 140 includes a first dichroic mirror 141 which is disposed in a position where light in the blue wavelength range emitted from the excitation light shining device 70 and light in the green wavelength range emitted from the luminescent plate 101 intersect light in the red wavelength range emitted from the red light source device 120. The first dichroic mirror 141 transmits both lights in the blue and red wavelength ranges and reflects light in the green wavelength range in such a way as to turn the axis of the light in the green wavelength range through 90 degrees to the left.

A first reflecting mirror 143 is disposed on the axis of light in the blue wavelength range which is transmitted through the luminescent plate 101 as it is or while being diffused, that is, ahead of the collective lens 115. This first reflecting mirror 143 reflects light in the blue wavelength range so that the axis of the light in the blue wavelength range is turned through 90 degrees to the left. A collective lens 146 is disposed leftwards of the first reflecting mirror 143, and a second reflecting mirror 145 is disposed on a side of this collective lens 146 which faces a left panel 15 of the case 16. The second reflecting mirror 145 turns the axis of light in the blue wavelength range which is reflected by the first reflecting mirror 143 to be incident thereon by way of the collective lens 146 to the rear. A collective lens 147 is disposed behind the second reflecting mirror 145.

A collective lens 149 is disposed leftwards of the first dichroic mirror 141. Further, a second dichroic mirror 148 is disposed leftwards of the collective lens 149 and behind the collective lens 147. The second dichroic mirror 148 reflects light in the red wavelength range and light in the green wavelength range so that the axes of the red and green lights are turned through 90 degrees to the rear and transmits light in the blue wavelength range.

The axis of light in the red wavelength range which is transmitted through the first dichroic mirror 141 and the axis of light in the green wavelength range which is reflected by the first dichroic mirror 141 so that the axis thereof coincides with the axis of the light in the red wavelength range are directed to the collective lens 149. Then, the lights in the red and green wavelength ranges which pass through the collective lens 149 are reflected by the second dichroic mirror 148 to be collected to the entrance port of the light tunnel 175 by way of a collective lens 173 of the light source-side optical system 170. On the other hand, light in the blue wavelength range which is transmitted through the collective lens 147 is then transmitted through the second dichroic mirror 148 to be collected to the entrance port of the light tunnel 175 by way of the collective lens 173.

The light source-side optical system 170 includes the collective lens 173, the light tunnel 175, a collective lens 178, a light axis turning mirror 181, a collective lens 183, a shining mirror 185 and a condenser lens 195. Since the condenser lens 195 emits image light emitted from the display device 51 which is disposed at the rear of the condenser lens 195 towards the projection-side optical system 220, the condenser lens 195 is also regarded as constituting part of the projection-side optical system 220.

The collective lens 173 is disposed near the light tunnel 175, and this collective lens 173 collects light source light to the entrance port of the light tunnel 175. Consequently, light in the red wavelength range, light in the green wavelength range and light in the blue wavelength range are collected by the collective lens 173 to be incident on the light tunnel 175. Once pencils of light in the red, green and blue wavelength ranges are incident on the light tunnel 175, the pencils of red, green and blue light are converted into pencils of red, green and blue light whose intensities are distributed uniformly by the light tunnel 175.

The light axis turning mirror 181 is disposed on an optical axis of the light tunnel 175 in a position lying rearwards of the light tunnel 175 with the collective lens 178 disposed therebetween. Pencils of light which exit from an exit port of the light tunnel 175 are collected by the collective lens 178, whereafter the axes of the pencils of light are turned to the left by the light axis turning mirror 181.

The pencils of light reflected by the light axis turning mirror 181 are collected by the collective lens 183, whereafter the pencils of light are shone onto the display device 51 at a predetermined angle by way of the condenser lens 195 by the shining mirror 185.

The pencils of red, green and blue light, which are light source light, are shone onto an image forming surface of the display device 51 by the light source-side optical system 170 and are then reflected on the image forming surface of the display device 51 to thereby be projected onto a screen by way of the projection-side optical system 220 as projected light. Here, the projection-side optical system 220 includes the condenser lens 195, the movable lens group 235 and a fixed lens group 225. The movable lens group 235 is made to be moved by the lens motor. Then, the movable lens group 235 and the fixed lens group 225 are incorporated in fixed lens barrels. Thus, the fixed lens barrel which incorporates the movable lens group 235 is made as a variable-focus lens which can be adjusted for zooming or focusing.

Figure 4:
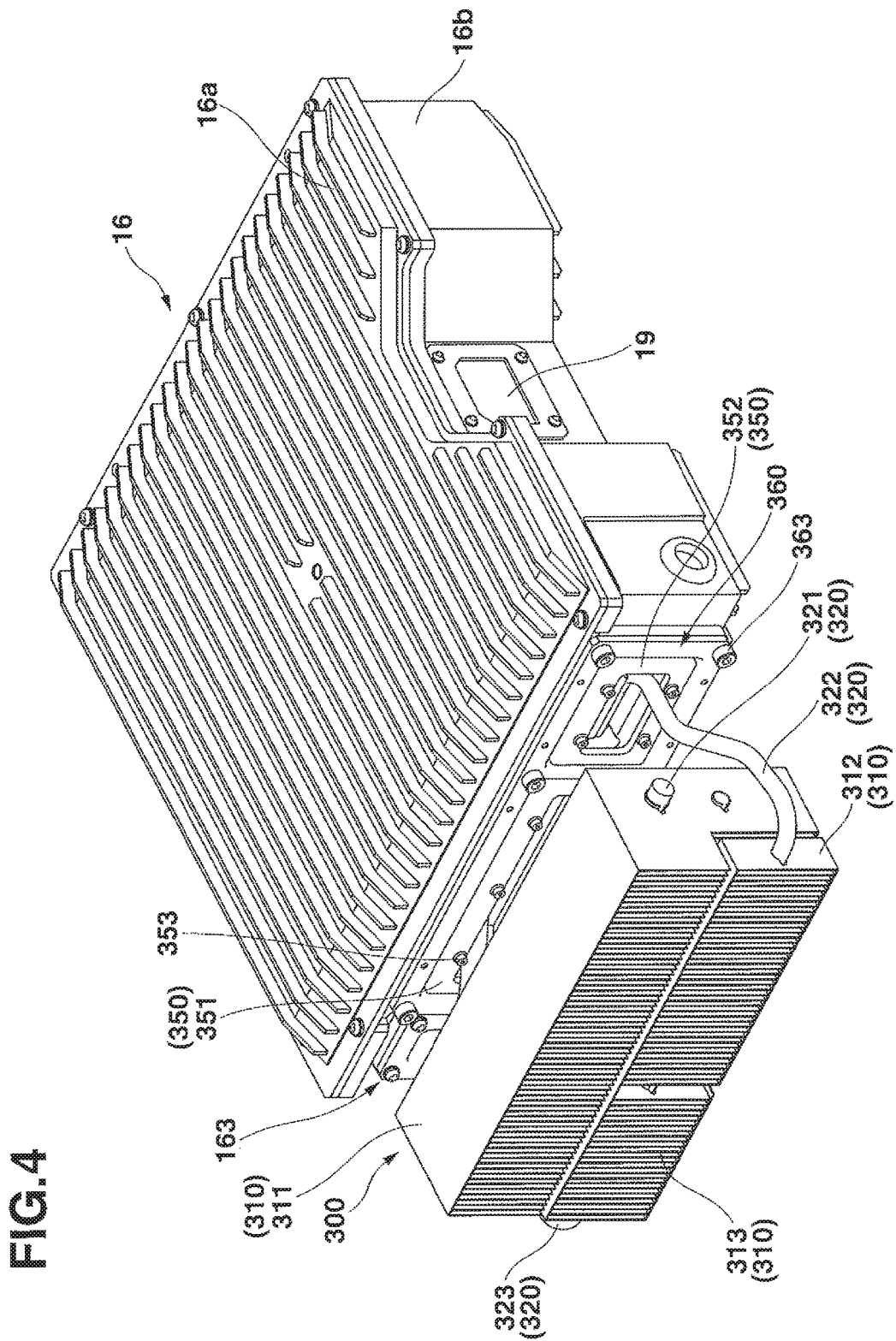
FIG. 4 is a perspective view showing a case and a cooling unit according to the embodiment of the invention.

A cooling unit 300 is disposed on the light side of the case 16 in an interior of the casing 11 of the projector 10. As shown in FIGS. 3 and 4, the cooling unit 300 includes a plurality of heat sinks 310 (a first heat sink 311, a second heat sink 312, and a third heat sink 313), a plurality of heat sink pipes 320 (a first heat sink pipe 321, a second heat sink pipe 322, and a third heat sink pipe 323), a plurality of cooling members 330 (a first cooling member 331, and a second cooling member 332) which are attachment members, and a cooling plate 333 (refer to FIG. 3) which is disposed inside the case 16. The first cooling member 331, the second cooling member 332 and the cooling plates 333 are formed individually of a highly heat conductive material such as aluminum.

The first cooling member 331 is connected to a back surface of the holder 74 which holes the plurality of blue laser diodes 71 of the excitation light shining device 70 inside the case 16 shown in FIG. 3. This first cooling member 331 and the first heat sink 311 are connected together by the first heat sink pipe 321. Consequently, heat from the plurality of blue laser diodes of the excitation light shining device 70 is conducted from the holder 74 to the first heat sink 311 by way of the first cooling member 331 and the first heat sink pipe 321 to thereby be dissipated by the first heat sink 311.

Similarly, the second cooling member 332 is connected to a back surface of the red light source 121. Then, the second cooling member 332 and the second heat sink 312 are connected together by the second heat sink pipe 322. The cooling plate 333 which is connected to a back surface of the display device 51 is connected to the third heat sink 313 by the third heat sink pipe 323. Consequently, heat from the red light source 121 of the red light source device 120 and heat from the display device 51 are conducted to the second heat sink 312 and the third heat sink 313 by way of the second heat sink pipe 322 and the third heat sink pipe 323 to thereby be dissipated by the second heat sink 312 and the third heat sink 313, respectively.

The case 16 is formed of a highly heat conductive material such as a diecast metal of aluminum. A plurality of fins are formed on each of the upper surface and a lower surface of the case 16. Consequently, the luminescent plate device 100 is disposed within the case 16 while being thermally connected to the case 16, whereby heat produced from the luminescent plate device 100 is dissipated to the outside of the case 16 sufficiently.

By configuring the projector 10 in the way described above, when lights are emitted by rotating the luminescent plate 101 and from the excitation light shining device 70 and the red light source device 120 at different timings, lights in the red, green and blue wavelength ranges are sequentially incident on the collective lens 173 and the light tunnel by way of the light guiding optical system 140 and are further incident on the display device 51 by way of the light source-side optical system 170, where the display device 51, which is the DMD, of the projector 10 displays the lights in the red, green and blue wavelength ranges in a timesharing fashion, whereby a color image can be projected onto the screen.

Next, an attaching construction of attaching the cooling members 330 to the case 16 will be described in detail. As shown in an exploded perspective view of FIG. 5, a first opening portion 161 and a second opening portion 162 are formed in a right wall of the case 16 as opening portions 160. The first opening portion 161 and the second opening portion 162 are partitioned by a beam-shaped partitioning portion 160a. The first opening portion 161 is formed into a substantially rectangular hole which is elongated in a front-and-rear direction. The second opening portion 162 is formed into a substantially square hole. The first cooling member 331 is attached to the first opening portion 161. The second cooling member 332 is attached to the second opening portion 162. The first heat sink pipe 321 and the second heat sink pipe 322 are fixed to the first cooling member 331 and the second cooling member 332, respectively.

The cooling members 330 (the first cooling member 331, the second cooling member 332) are attached to the opening portions 160 (the first opening portion 161, the second opening portion 162) via a seal member 340. Fixing members 350 (a first fixing member 331, a second fixing member 352) which are formed into annular flat frames are fixed to the cooling members 330 (the first cooling member 331, the second cooling member 332), respectively, with a plurality of screws 353. A flat frame-shaped fastening member 360 is fixed to outer circumferences of the opening portions 160 of the case 16 with screws 363. The fastening member 360 includes a first fastening portion 361 having an annular frame-like shape and a second fastening portion 362 having an annular frame-like shape. When the fastening member 360 is attached to the opening portions 160, the first fastening portion 361 is aligned with the first opening portion 161 for attachment thereto, and the second fastening portion 362 is aligned with the second opening portion 162 for attachment thereto. The first fastening portion 361 and the second fastening portion 362 are integrated into the fastening member 360.

An end portion of the first heat sink 321 is formed into a straight line and is inserted into an attachment hole 311a of the first heat sink 311. Similarly, end portions of the second heat sink 322 and the third heat sink 313 are inserted into attachment holes 312a, 313a of the second heat sink pipe 322 and the third heat sink pipe 323, respectively.

On the other hand, a seal hole portion 163 is formed in the case 16 at the rear of the first opening portion 161. The seal hole portion 163 is formed by fixing a substantially plate-shaped seal member 163a to a rectangular hole in the case 16 with a fastening frame plate 163b. The plate-shaped seal member 163a is formed of an elastic material such as rubber. The third heat sink pipe 323 passes through the plate-shaped seal member 163a of the seal hole portion 163 to be inserted into the case 16. Consequently, an outer circumference of the third heat sink pipe 323 at the seal hole portion 163 is sealed up by the plate-shaped seal member 163.

Figure 5:
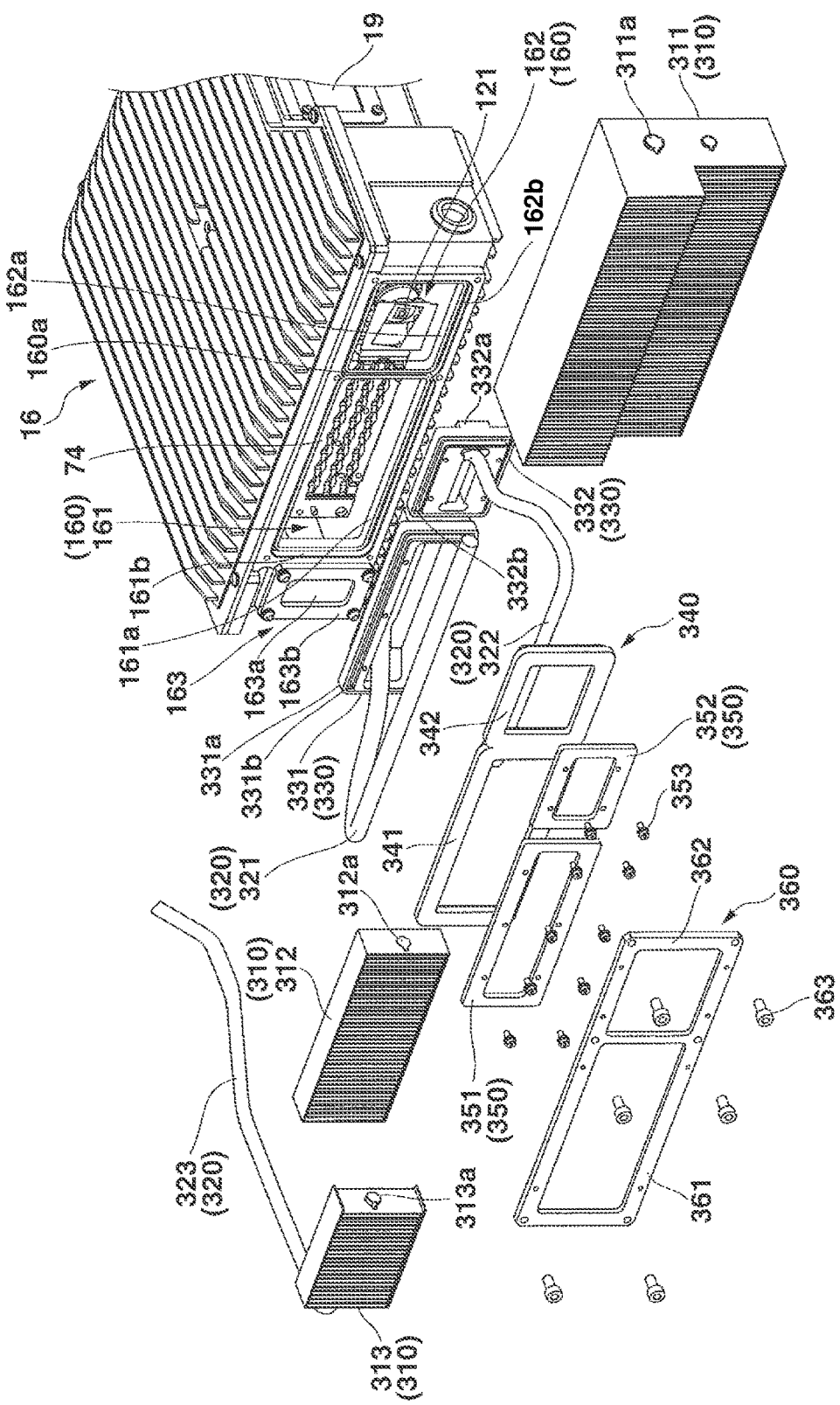
FIG. 5 is an exploded perspective view showing the case and the cooling unit according to the embodiment of the invention.
Figure 6A:
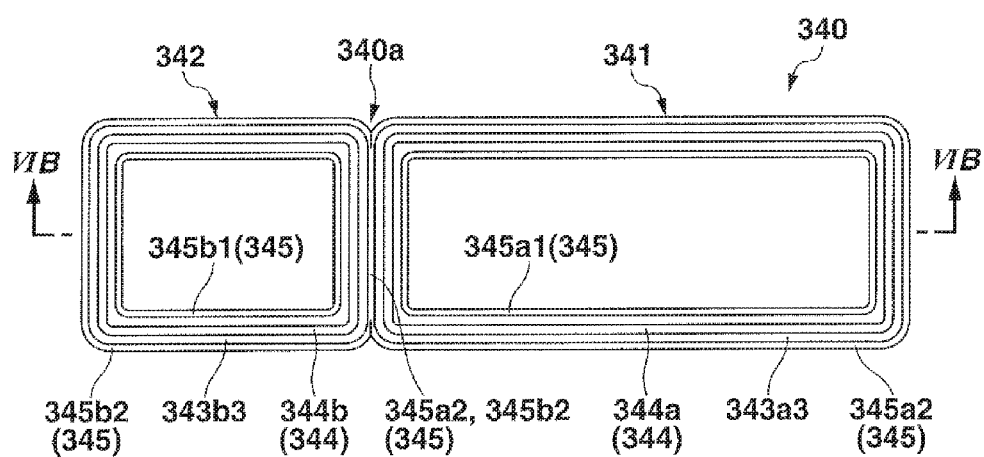
FIG. 6A is a rear view of a seal member according to the embodiment of the invention.
Figure 6B:
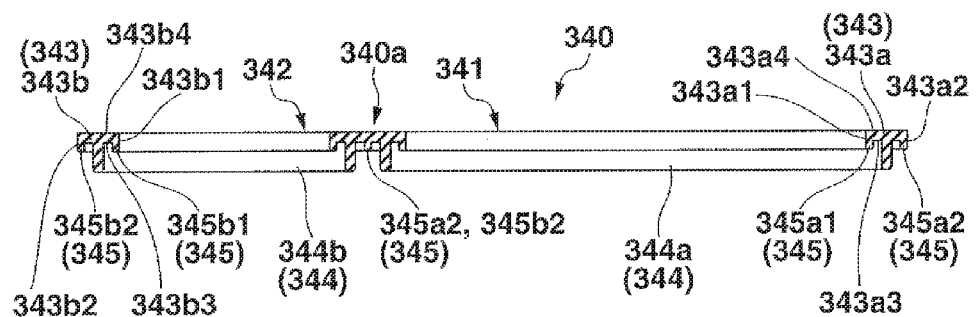
FIG. 6B is a sectional view of the seal member according to the embodiment of the invention taken along a line VIb-VIb-in FIG. 6A.

Here, the seal member 340 will be described based on FIGS. 6A and 6B. FIG. 6A is a view resulting when the seal member 340 shown in FIG. 5 is seen from a back surface side thereof, and FIG. 6B is a sectional view taken along a line VIb-VIb in FIG. 6A. The seal member 340 is formed of an elastic material such as silicone rubber. In the seal member 340, a first seal portion 341 and a second seal portion 342 are integrated with each other at a joint portion 340a. The first seal portion 341 is formed into a rectangular frame and is attached to the first opening portion 161. The second seal portion 342 is formed into a substantially square frame and is attached to the second opening portion 162.

A first annular flat plate portion 343a and a second annular flat plate portion 343b are formed as annular flat plate portions 343 in the first seal portion 341 and the second seal portion 342, respectively. Side edge surfaces of the annular flat plate portions 343 (the first annular flat plate portion 343a, the second annular flat plate portion 343b) constitute inner and outer circumferential surfaces thereof. Specifically, a side edge surface 343a1 of the first annular flat plate portion 343a constitutes an inner circumferential surface, and a side edge surface 343a2 of the first annular flat plate portion 343a constitutes an outer circumferential surface. Similarly, a side edge surface 343b1 of the second annular flat plate portion 343b constitutes an inner circumferential surface, and a side edge surface 343b2 of the second annular flat plate portion 343b constitutes an outer circumferential surface.

Then, annular rib portions 344 are provided on flat plate surfaces of the annular flat plate portions 343 (the first annular flat plate portion 343a, the second annular flat plate portion 343b) so as to rise therefrom perpendicularly to the flat surfaces. Specifically, a first annular rib portion 344a is provided on one flat plate surface 343a3 of the first annular flat plate portion 343a so as to rise therefrom perpendicularly. Similarly, a second annular rib portion 344b is provided on one flat plate surface 343b3 of the second annular flat plate portion 343b so as to rise therefrom perpendicularly. The other flat plate surfaces (flat plate surfaces 343a4, 343b4) of the annular flat plate portions 343 (the first annular flat plate portion 343a, the second annular flat plate portion 343b) are formed into flat surfaces.

Further, annular projections 345 are formed individually on an inner circumferential surface side and an outer circumferential surface side of the annular rib 344 on the flat plate surface of each of the annular flat plate portions 343. Specifically, an annular projection 345a1 is formed on an inner circumferential surface side of the flat plate surface 343a3 of the first annular flat plate portion 343a, and an annular projection 345a2 is formed on an outer circumferential surface side of the flat plate surface 343a3 of the first annular flat plate portion 343a. Similarly, an annular projection 345b1 is formed on an inner circumferential surface side of the flat plate surface 343b3 of the second annular flat plate portion 343b, and an annular projection 345b2 is formed on an outer circumferential surface side of the flat plate surface 343b3 of the second annular flat plate portion 343b. Then, the annular projection 345a2 on the outer circumferential surface side of the first annular rib portion 344a and the annular projection 345b2 on the outer circumferential surface side of the second annular rib portion 344b at the joint portion 340a where the first seal portion 341 and the second seal portion 342 are joined together are formed into a single projection which is used commonly for the first seal portion 341 and the second seal portion 342.

Figure 7:
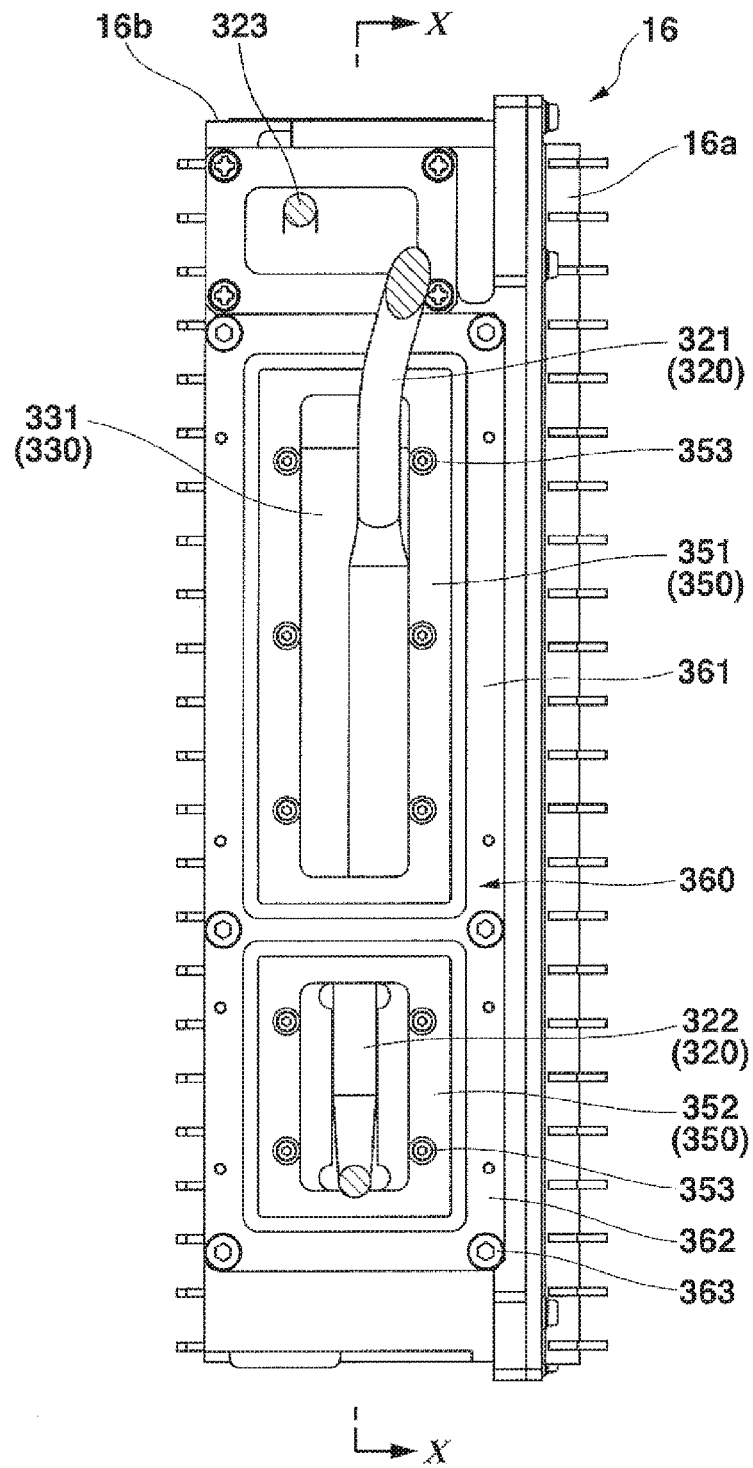
FIG. 7 is a sectional view of the case and the cooling unit according to the embodiment of the invention taken along a line VII-VII in FIG. 3.

In addition, as shown in FIGS. 5 and 7, the first cooling member 331 and the second cooling member 332 have individually recessed portions formed therein where the first heat sink pipe 321 and the second heat sink pipe 322 are fixed in place by means of welding or the like. As shown in FIG. 3, an inner surface of the first cooling member 331 is brought into abutment with the holder 74 of the excitation light shining device. Similarly, an inner surface of the second cooling member 332 is brought into abutment with a rear plate of the red light source 121 of the red light source device 120.

As shown in FIGS. 5 and 8 to 10, outer circumferential surfaces of the first cooling member 331 and the second cooling member 332 constitute annular attachment surfaces 331a, 332a, respectively. Further, annular groove portions 331b, 332b are formed on outer surfaces of the first cooling member 331 and the second cooling member 332, respectively, in positions lying near outer circumferential edges thereof. The annular groove portions 331b, 332b are formed closer to centers of the first cooling member 331 and the second cooling member 332 than the attachment surfaces 331a, 332a thereof.

On the other hand, inner circumferential surfaces of the first opening portion 161 and the second opening portion 162 constitute annular attachment surfaces 161a, 162a, respectively. Further, annular groove portions 161b, 162b are formed on outer surfaces of the first opening portion 161 and the second opening portion 162, respectively, in positions lying near inner circumferential edges thereof. The attachment surfaces 161a, 162a are formed closer to centers of the first opening portion 161 and the second opening portion 162 than the annular groove portions 161b, 162b thereof. The annular groove portion 161b of the first opening portion 161 and the annular groove portion 162b of the second opening portion 162 at the beam-shaped partitioning portion 160a by which the first opening portion 161 and the second opening portion 162 are partitioned is formed into a single groove portion which is used commonly for the first opening portion 161 and the second opening portion 162.

Figure 8:
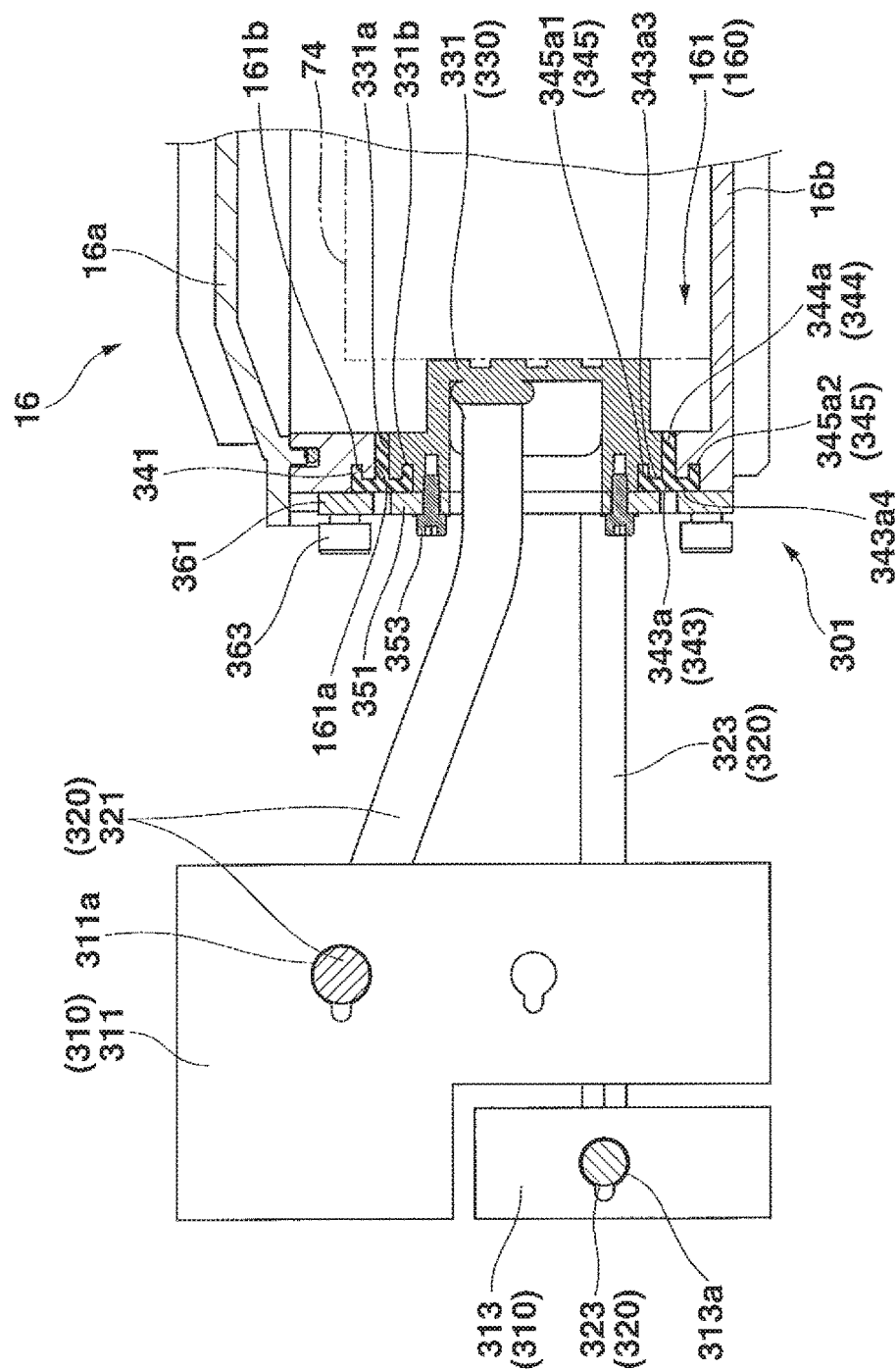
FIG. 8 is a partially enlarged sectional view of the case and the cooling unit according to the embodiment of the invention taken along a line VIII-VIII in FIG. 3 showing the periphery of cooling members.
Figure 9:
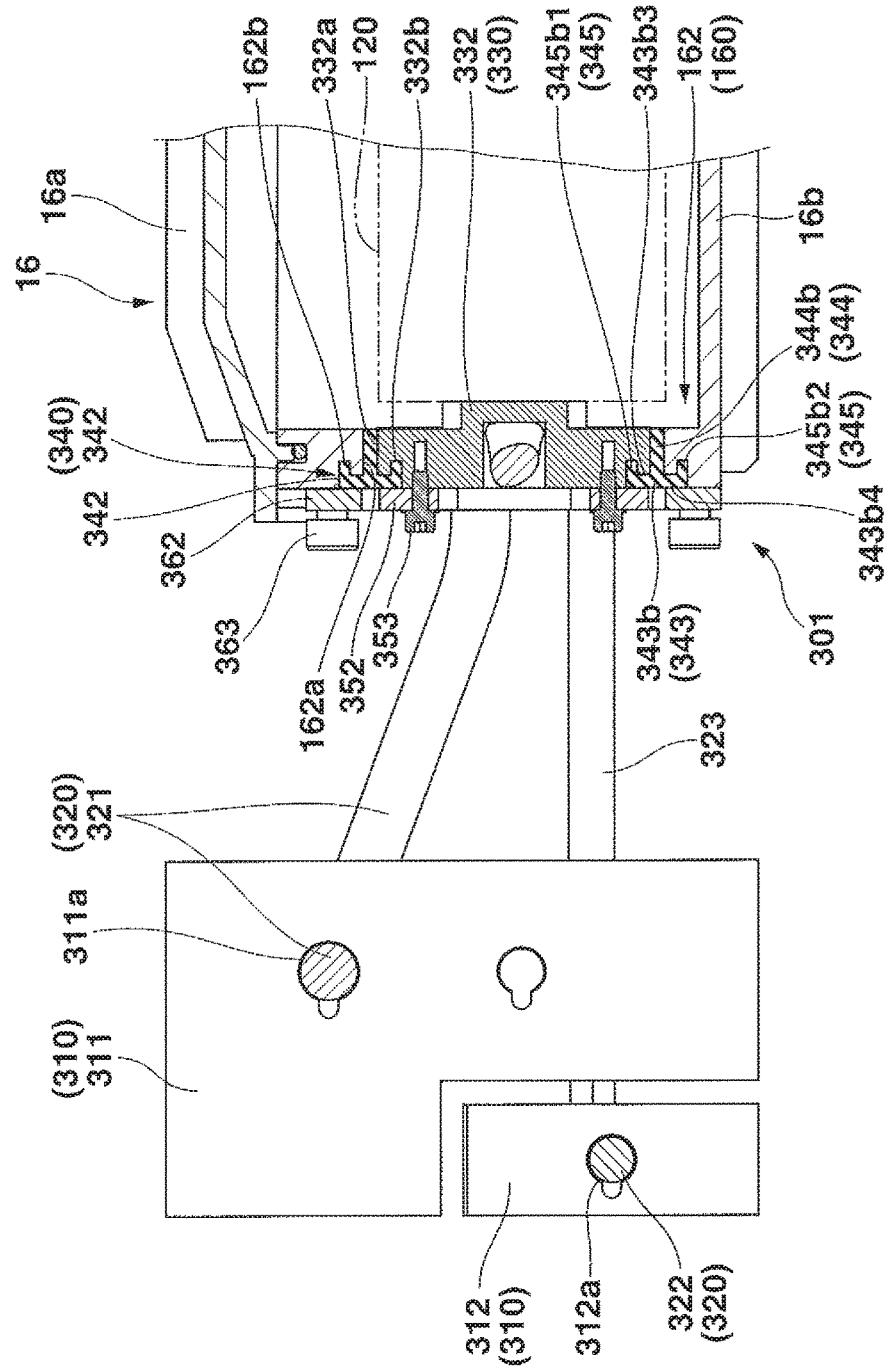
FIG. 9 is a partially enlarged sectional view of the case and the cooling unit according to the embodiment of the invention taken along a line IX-IX in FIG. 3 showing the periphery of the cooling members.
Figure 10:
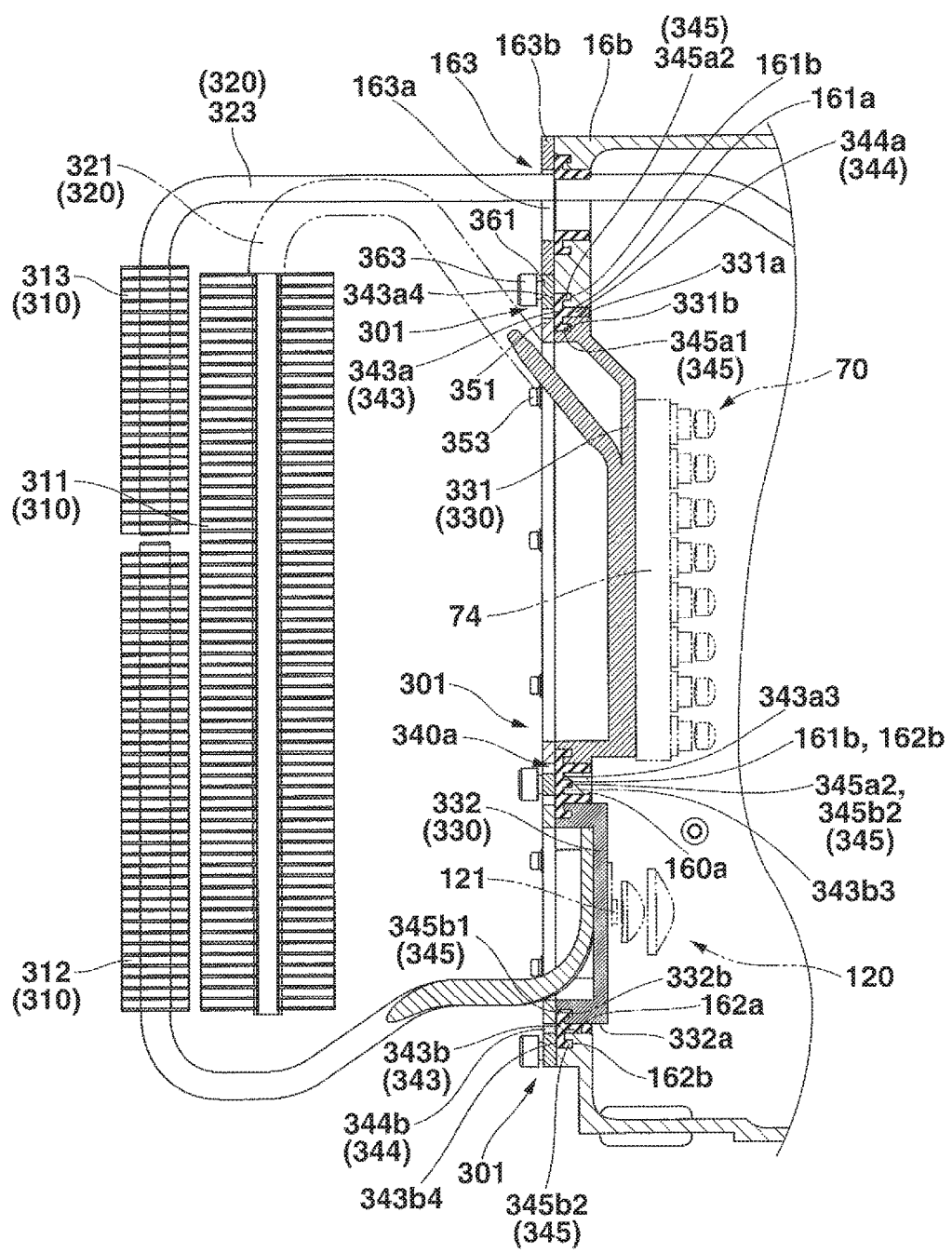
FIG. 10 is a partially enlarged sectional view of the case and the cooling unit according to the embodiment of the invention taken along a line X-X in FIG. 7 showing the periphery of the cooling members.

FIGS. 8 to 10 show a sealing unit 301 in such a state that the cooling members 330 are attached to the opening portions 160. As shown in FIG. 8, an outer circumferential surface of the first annular rib portion 344a of the first seal portion 341 of the seal member 340 is brought into abutment with the attachment surface 161a of the first opening portion 161 so as to contact the attachment surface 161a in a face-to-face fashion. An inner circumferential surface of the first annular rib portion 344a is brought into abutment with the attachment surface 331a of the first cooling member 331 so as to contact the attachment surface 331a in a face-to-face fashion.

The annular projection 345a1 on the inner circumferential surface side of the first annular rib portion 344a is fitted in the annular groove portion 331b of the first cooling member 331. Similarly, the annular projection 345a2 on the outer circumferential surface side of the first annular rib portion 344a is fitted in the annular groove portion 161b of the first opening portion 161.

On the other hand, the first fixing member 351 is brought into abutment with the other flat plate surface 343a4 of the first seal portion 341 of the seal member 340 at a flat surface portion thereof and is fixed to the first cooling member 331 with the plurality of screws 353. Then, the first fastening portion 361 of the fastening member 360 is brought into abutment with the other flat plate surface 343a4 of the first seal portion 341 of the seal member 340 at a flat surface portion thereof. Then, the fastening member 360 is fixed to the case with the plurality of screws 363.

Similarly, as shown in FIG. 9, an outer circumferential surface of the second annular rib portion 344b of the second seal portion 342 of the seal member 340 is brought into abutment with the attachment surface 162a of the second opening portion 162 so as to contact the attachment surface 162a in a face-to-face fashion. An inner circumferential surface of the second annular rib portion 344b is brought into abutment with the attachment surface 332a of the second cooling member 332 so as to contact the attachment surface 332a in a face-to-face fashion.

The annular projection 345b1 on the inner circumferential surface side of the second annular rib portion 344b is fitted in the annular groove portion 332b of the second cooling member 332. Similarly, the annular projection 345b2 on the outer circumferential surface side of the second annular rib portion 344b is fitted in the annular groove portion 162b of the second opening portion 162.

On the other hand, the second fixing member 352 is fixed to the second cooling member 332 with the plurality of screws 353 while being in abutment with the other flat plate surface 343b4 at the flat surface portion thereof. Then, the second fastening portion 362 of the fastening member 360 is brought into abutment with the other flat plate surface 343b4 of the second seal portion 342 of the seal member 340 at a flat surface portion thereof. Then, the fastening member 360 is fixed to the case 16 with the plurality of screws 363.

As shown in FIG. 10, the single projection formed at the joint portion 340a of the seal member 340 which is used commonly as the annular projections 345a2, 345b2 of the first and second seal portions 341, 342 are fitted in the single groove portion formed at the partitioning portion 160a which is used commonly as the annular groove portions 161b, 162b of the first and second opening portions 161, 162. The fastening member 360 is disposed on an outer circumference of the fixing member 350.

The cooling members 330 are dimensioned to be attached to the opening portions 160 in such a way as to be pressed against the objects to be cooled in a face-to-face fashion. Specifically, the first cooling member 331 is brought into abutment with the holder 74 of the excitation light shining device 70, and the second cooling member 332 is brought into abutment with the red light source 121 of the red light source device 120. Here, the excitation light shining device 70 and the red light source device 120 are disposed in the interior of the case 16 within the range of the permissible assemblage tolerance. Then, there may be a case where the excitation light shining device 70 and the red light source device 120 are assembled to the case 160 in an inclined fashion. However, since the cooling members 330 are attached to the opening portions 160 via the seal member 340 which is formed of the elastic material, even though the cooling members 330 are brought into abutment with the objects to be cooled which are disposed in the inclined fashion, the twisting of the seal member 340 is reduced which disposed between the outer circumference of the cooling members 330 and the inner circumference of the opening portions 160, thereby preventing the reduction in sealing performance of the seal member 340.

Thus, while the embodiment of the invention has been described heretofore, the invention is not limited to the embodiment at all and hence can be carried out in various modified forms. For example, in this embodiment, while the sealing unit 301 is described as being applied to the projector 10 including the case 16 in which the light source unit 60, the projection-side optical system 220 and the like are disposed, the sealing unit 301 can also be applied to other devices and equipment.

In addition, in this embodiment, while the cooling members 330 of the cooling unit 300 are described as being the attachment members, the invention is not limited thereto, and hence, the sealing unit 301 can be applied to an attachment member which is attached to an opening portion of a case. In addition, while the fixing member 350 and the fastening member 360 are described as being formed into the frame-shaped flat plates, the invention is not limited thereto. For example, the fixing member 350 and the fastening member 360 maybe configured as members that are brought into abutment with portions of the other flat plate surfaces 343a4, 343b4 of the seal member 340.

Thus, as has been described heretofore, in the sealing unit 301 of this embodiment, the outer circumferential surfaces of the annular rib portions 344 of the seal member 340 are brought into abutment with the attachment surfaces 161a, 162a of the opening portions 160, and the inner circumferential surfaces thereof are brought into abutment with the attachment surfaces 331a, 332a of the cooling members 330. Then, the fixing member 350 is brought into abutment with the other flat plate surfaces 343a4, 343b4 of the seal member 340 and is fixed to the cooling members 330. Similarly, the fastening member 360 is brought into abutment with the other flat plate surfaces 343a4, 343b4 of the seal member 340 and is fixed to the case 16.

By doing so, the gaps between the opening portions 160 and the cooling members 330 are sealed up by the annular rib portions 344 of the seal member 340. Then, the annular flat plate portions 343 of the seal member 340 are held by the fixing member 350 and the cooling members 330 therebetween and by the fastening member 360 and the case 16 therebetween. Consequently, the cooling members 330 are supported in the opening portions 160 by the seal member 340. Thus, even though the cooling members 330 follow the excitation light shining device 70 and the red light source device 120, which are the objects to be cooled, to thereby be inclined, the seal member 340 is prevented from being twisted, whereby the reduction in sealing performance of the seal member 340 is prevented.

In addition, the seal member 340 has the annular projections 345 which project from the annular flat plate portions 343. Then, the annular groove portions 331b, 332b are formed in the cooling members 330 so that the annular projections 345a1, 345b1 on the inner circumferential surface sides of the annular rib portions 344 are fitted therein. The annular groove portions 161b, 162b are formed near the outer circumferences of the opening portions 160 of the case 16 so that the annular projections 345a2, 345b2 on the outer circumferential surface sides of the annular rib portions 344 are fitted therein. By doing so, since the seal member 340 is fixed in a more ensured fashion, it is possible to prevent the deviation of the seal member 340.

In the opening portions 160, the first opening portion 161 and the second opening portion 162 are formed adjacent to each other. Then, in the seal member 340, the first seal portion 341 which is attached to the first opening portion 161 and the second seal portion 342 which is attached to the second opening portion 162 are formed integrally with each other. The single projection is provided at the joint portion 340a where the first seal portion 341 and the second seal portion 342 are joined together is commonly used as the annular projections 345a2, 345b2. By doing so, since the opening portions 160 and the seal member 340 can be formed compact in size, the projector 10 can also be formed compact in size.

In addition, the fixing member 350 and the fastening member 360 are formed individually into the annular frames. Consequently, the fixing member 350 and the fastening member 360 can be brought into abutment with the annular flat plate portions 343 of the seal member 340 along the full circumference thereof.

The cooling members 330 are connected to the heat sinks 310 by way of the heat sink pipes 320. By doing so, the sealing unit 301 can be provided for the equipment which includes the cooling unit 300 outside the case 16.

The light source unit 60, the display device 51, the projection-side optical system 220 and the projector control unit are accommodated in the cases 16, and the cooling members 330 are disposed so as to be in abutment with the light source unit 60 (the excitation light shining device 70, the red light source device 120). Consequently, the light source unit 60 whose heat value is particularly great can be cooled effectively while the light source unit 60 is disposed within the case 16. In particular, the excitation light shining device 70 which includes the blue laser diodes 71 which are semiconductor light emitting devices and the red light source device 120 which includes the red light emitting diode can be cooled as required while these light sources are disposed within the case 16 which can prevent dust from intruding thereinto to adhere to the light sources.

In the embodiment, while the annular rib portions 344 are described as being provided on the flat plate surfaces of the annular flat plate portions 343 of the seal member 340 so as to rise therefrom, annular rib portions may also be provided on the other flat plate surfaces of the annular flat plate portions 343 so as to rise therefrom.

In addition, while the seal member 340 is described as having the annular projections 345 individually on the inner circumferential surface side and the outer circumferential surface side of the annular rib portions 344 on the flat plate surfaces of the annular flat plate portions 343, the seal member 340 may also have annular projections individually on the inner circumferential surface side and the outer circumferential surface side of the annular rib portions 344 on the other flat plate surfaces of the annular flat plate portions 343.

While the embodiment of the invention has been described heretofore, the embodiment is presented as the example and is not intended at all to limit the scope of the invention. The novel embodiment can be carried out in other various forms, and hence, various omissions, replacements and modifications can be made thereto without departing from the spirit and scope of the invention. The resulting embodiments and their modifications are included in the spirit and scope of the invention and are also included in the scope of inventions claimed for patent in claims and their equivalents.

What is claimed is:

1. A sealing unit, comprising:
a case which comprises an opening portion on an inner circumference of which an attachment surface is formed;
a seal member which comprises (i) an annular flat plate portion whose side edge surfaces constitute inner and outer circumferential surfaces, and (ii) an annular rib portion which is provided on one flat plate surface of the annular flat plate portion so as to rise therefrom and which is made of an elastic material;
an attachment member which comprises an annular attachment surface on an outer circumference thereof;
a fixing member; and
a fastening member,
wherein an outer circumferential surface of the annular rib portion of the seal member is brought into abutment with the attachment surface of the opening portion,
wherein an inner circumferential surface of the annular rib portion of the seal member is brought into abutment with the attachment surface of the attachment member,
wherein the fixing member is brought into abutment with the other flat plate surface of the annular flat plate portion of the seal member and is fixed to the attachment member,
wherein the fastening member is brought into abutment with the other flat plate surface of the annular flat plate portion of the seal member and is fixed to the case,
wherein the attachment member is held in the case via the seal member,
wherein the annular flat plate portion of the seal member has annular projections which are formed individually on an inner circumferential surface side and an outer circumferential surface side of the annular rib portion on the one flat plate surface of the annular flat plate portion,
wherein the attachment member has an annular groove portion formed on the attachment member into which the annular projection on the inner circumferential surface side of the annular rib portion is fitted,
wherein the case has an annular groove formed on the case into which the annular projection on the outer circumferential surface side of the annular rib portion is fitted,
wherein the opening portion is formed at two locations in the case as a first opening portion and a second opening portion,
wherein the seal member comprises a first seal portion configured to be attached to the first opening portion and a second seal portion configured to be attached to the second opening portion which are joined together so as to be integrated into a unit at a joint portion,
wherein the annular flat plate portion, the annular rib portion, and the annular projections are formed on each of the first seal portion and the second seal portion, and
wherein the annular projections on the outer circumferential surface sides of the annular rib portions are merged into a single projection at the joint portion for common use between the first seal portion and the second seal portion.

2. The sealing unit according to claim 1, wherein the fixing member and the fastening member each have an annular shape.

3. The sealing unit according to claim 1, wherein the attachment member is a cooling member which is connected to a heat sink by way of a heat sink pipe.

4. The sealing unit according to claim 2, wherein the attachment member is a cooling member which is connected to a heat sink by way of a heat sink pipe.

5. A projector, comprising:
the sealing unit according to claim 4,
wherein the case accommodates:
a light source unit;
a display device on which light source light is shone to thereby form image light;
a projection-side optical system which projects the image light emitted from the display device onto a screen; and
a projector control unit which controls the display device and the light source unit, and
wherein the cooling member is disposed so as to be brought into abutment with the light source unit.

6. A projector, comprising:
the sealing unit according to claim 4, wherein
the case accommodates:
a light source unit;
a display device on which light source light is shone to thereby form image light;
a projection-side optical system which projects the image light emitted from the display device onto a screen; and
a projector control unit which controls the display device and the light source unit, and
wherein the cooling member is disposed so as to be brought into abutment with the light source unit.

7. The projector according to claim 5, wherein the light source unit comprises a semiconductor light emitting device.

* * * * *